United States Patent [19]

Grutsch et al.

[11] 4,274,968
[45] Jun. 23, 1981

[54] PROCESS FOR THE PURIFICATION OF WATER

[75] Inventors: James F. Grutsch, Hammond; Russell C. Mallatt, Crown Point, both of Ind.; Joe D. Walk, Homewood, Ill.

[73] Assignee: Standard Oil Company (Indiana), Chicago, Ill.

[21] Appl. No.: 806,750

[22] Filed: Jun. 15, 1977

[51] Int. Cl.³ .............................................. C02F 1/28
[52] U.S. Cl. ..................... 210/666; 210/694; 210/711; 210/787; 210/512.1
[58] Field of Search ............... 210/17, 18, 40, 735, 210/84, 666, 694, 711, 787, 512 R

[56] References Cited

U.S. PATENT DOCUMENTS

| | | | |
|---|---|---|---|
| 3,404,778 | 10/1968 | Woodruff et al. | 210/84 |
| 3,876,536 | 4/1975 | Pradt et al. | 210/18 |
| 3,904,518 | 9/1975 | Hutton et al. | 210/18 |
| 4,076,615 | 2/1978 | Olesen et al. | 210/18 |

Primary Examiner—Thomas G. Wyse
Attorney, Agent, or Firm—Frank J. Sroka; William T. McClain; William H. Magidson

[57] ABSTRACT

Disclosed is a process for the treatment of water so as to produce water of high purity, such as potable water. The process also entails the treatment of water which may have received prior water treatment, and comprises adding an effective amount of chemical flocculant to the feed water and subjecting said water to flocculation; passing the flocculated water to a clarifier where suspended solids are separated from the partially purified water; adding about 1 to about 100 parts powdered activated carbon per million parts of water from the clarifier; contacting the water with said carbon in a reaction zone so as to achieve substantial reduction of contaminants in the water; separating the activated carbon from the purified water; and recycling a portion of the separated activated carbon to the clarifier effluent.

26 Claims, 4 Drawing Figures

PROCESS FOR THE PURIFICATION OF WATER

BACKGROUND OF THE INVENTION

This invention relates to the treatment of water, such as, for example, municipal or industrial waste water, or river or lake water. This invention is especially useful in the purification of water to a very high degree such as for potable water.

Commonly surface waters such as lake or river water, or subterranean water is treated for use as potable water. These waters often contain materials which can cause bad taste or odor, or other harmful substances. Some of these substances are organic from decaying vegetation, such as humic acids. Other substances are from various agricultural or industrial application, such as aromatics, phenolics, and the like.

Potable water is commonly purified by treating the water with chemicals and activated carbon. The water is contacted with powdered activated carbon and chemicals such as alum and polyelectrolytes, and then passed to a flocculation zone where the mixture is gently mixed so as to promote flocculation while not unduly dispersing solids. The mixture is then passed to a clarification zone where sludge is disposed of, generally without the recovery of the alum. Sometimes the purified water is then contacted with carbon in a fixed bed granular carbon zone for a final clean up. Previously, the activated carbon has had relatively low activity and surface area. Also, the water purification processes have not made the best use of carbon on a per gallon of treated waste water basis.

Commonly waste water from industrial sources such as refineries, chemical plants, wood processing, food processing, and the like, and from municipal sources requires treatment in order to make it environmentally acceptable. The treatment of contaminated waste water from municipal or industrial sources involves a sequence of processing steps for maximizing water purification at minimum costs. Industrial effluents, particularly waste water from oil refineries, include a broad spectrum of contaminants, and, consequently, such waste water is usually more difficult to decontaminate than waste water from municipal sewage systems. Four main sequential process treatments are used to decontaminate such industrial effluents although similar treatment is given municipal effluents, or combined municipal/industrial effluents. These are a primary, intermediate, secondary, and tertiary treatments. The primary treatment calls for removal of gross amounts of oil and grease and solids from the waste water. In the oil industry, usually separators of American Petroleum Institute design are employed for removal of free, separable oil and solids. In municipal waste water treatment, generally little free oil is present but solids removal is still needed. The intermediate treatment is the next process and it is designed to adjust water conditions so that the water entering the secondary treatment zone will not impair the operation of the secondary treatment processes. In other words, intermediate treatment is designed to optimize water conditions so that the secondary treatment process will operate most efficiently. The secondary treatment calls for biologically degrading dissolved organics and ammonia in the water. One of the most common biological treatment processes employed is the activated sludge process discussed below in greater detail. The tertiary treatment calls for removing residual biological solids present in the effluent from the secondary treatment zone and removing contaminants which contribute to impairing water clarity or adversely affecting water taste and odor. This is usually a filtration of the water, preferably through beds of sand, or combinations of sand and coal, followed by treatment with activated carbon.

The activated sludge process is a conventional waste water treating process which produces the highest degree of biological treatment in reasonably compact facilities at the present time. The application of this process to the treatment of industrial waste water has, however, been slow compared with municipal applications. Industrial applications of this process are nevertheless increasing rapidly. Often the $BOD_5$ contaminants present in industrial waste water are relatively small compared with the total oxygen demanding contaminants present in such waste water as measured by the chemical oxygen demand (COD) test. For example, the $BOD_5$ contaminants present in the effluent from an activated sludge process typically ranges from 10 to 20 parts per million parts of water. It is not uncommon to also find present in such effluent 10 to 20 times this amount of COD.

The activated sludge process generally has at least two, preferably four stages of treatment. In the first stage, contaminated water is contacted with the activated sludge. The sludge includes micro-organisms which feed on the contaminants in the water and metabolize these contaminants to form cellular structure and intermediate products. This decontaminated water flows into a second clarifier stage where suspended sludge particles are separated from the decontaminated water. A portion of the sludge is recycled to the first stage and the remainder can be forwarded to the third and fourth stages as is taught in U.S. Ser. No. 657,497, filed Feb. 12, 1976. This sludge forwarded to the third and fourth stages includes water. In the third stage the sludge is thickened to remove excess water and in the fourth stage the thickened sludge is permitted to digest, that is, the micro-organisms feed upon their own cellular structure and are stabilized. Normally, the average age of these micro-organisms in the sludge is substantially less than ten days.

Activated carbon is sometimes used in tertiary treatment as a final clean up for purified water from the second stage clarifier. Some have taught that activated carbon or Fuller's earth can be used to treat waste water in a biological treatment process. U.S. Pat. No. 3,904,518 teaches that between about 50 and 1500 parts of activated carbon or between about 250 and 2500 parts of absorptive Fuller's earth per million parts of feed waste water can be beneficial in water purification. The carbon or Fuller's earth has a surface area of at least 100 square meters per gram and the activated carbon usually can have a surface area of between 600–1400 square meters per gram. However, the use of this relatively large amount of carbon is expensive and therefore it has not been widely used. Also, the carbon has a relatively low activity and surface area.

The conventional scheme of waste water treatment may not be able to meet the stringent water quality standards of the future. Therefore, a process for further purification of partially purified waste water is needed.

It is an object of this invention to provide an improved water treatment process and an improved waste water treatment process.

It is an object of this invention to provide an economical method of treating waste water through the efficient use of powdered activated carbon.

It is an object of this invention to provide a process for the production of potable water or water having a very high purity.

It is an object of this invention to provide an integrated waste water treatment scheme for the purification of water to very high levels of purity.

SUMMARY OF THE INVENTION

This invention relates to the treatment of water and waste water. This invention especially relates to the production of potable water and the purification of waste water to very high levels of purity.

The process of water treatment to produce potable water and water of very high levels of purity generally comprises adding an effective amount of chemical flocculant to the feed water and subjecting said water to flocculation; passing the flocculated water to a clarifier where suspended solids are separated from the partially purified water; adding about 1 to about 100 parts powdered activated carbon per million parts of water from the clarifier; contacting the water with said carbon in a reaction zone so as to achieve substantial reduction of contaminants in the water; separating the activated carbon from the purified water; and recycling a portion of the separated activated carbon to the clarifier effluent.

Commonly the concentration of activated carbon in the reaction zone is greater than about 25 ppm, but preferably greater than about 50 ppm, based on feed water. Because the activated carbon is separated from the purified water and at least a portion of the separated carbon recycled to the clarifier effluent, the concentration of activated carbon based on water in the reaction zone is substantially higher than the addition rate concentration of fresh carbon, sometimes as high as one percent based on feed water, or higher. By the recycling of carbon, impurities present in the water are contacted with extremely high concentration of activated carbon and therefore an extremely high purity of water is produced. Alternatively, a given water purity can be achieved at smaller reactor size. The recycling of activated carbon also leads to better carbon utilization. Commonly a portion of the separated activated carbon is recycled to the water feed to flocculation, preferably without regeneration.

The water to be treated is contacted with an effective amount of chemical flocculant. These flocculants are well known, some commonly used ones being alum, iron, lime and polyelectrolytes. Different amounts of flocculant are needed depending on the application and type of flocculant. Sometimes these materials are used at concentrations of 100 mg/l or higher. Commonly polyelectrolytes are used at lower concentrations, such as from about 0.1 to about 10 mg/l. Often times cationic polyelectrolytes are used at concentrations from about 0.5 to about 10 mg/l and anionic polyelectrolytes are used at concentrations from about 0.1 to about 2 mg/l. One preferred polyelectrolyte is a high molecular weight polyacrylamide being 5 to 30 percent hydrolyzed. During flocculation the water being treated is mixed gently to achieve effective flocculation without unduly dispersing small particles. The flocculated water is then passed to a clarifier to remove suspended solids. Clarification is commonly effected by gravity settling and sometimes followed by filtration.

The powdered activated carbon generally has a BET surface area greater than about 1500, preferably greater than about 2500 square meters per gram. Commonly such activated carbon has a particle size such that at least 50 percent of it will pass through at 200 mesh per inch sieve, although generally about 70 to 99 percent will pass through such a sieve.

Activated carbon is commercially available. High activity, high surface area activated carbon will be available under the Amoco trademark. Suitable processes for making activated carbons can be found in U.S. Pat. Nos. 3,709,930; 3,726,808; 3,624,004; 3,642,657; 3,817,874; and 3,833,514, which are hereby incorporated by reference and made a part thereof.

Some powdered activated carbons have a high, negative electrical surface charge, for example a zeta potential of $-20$ to $-30$ millivolts. Coulombic repulsive forces keep more and more of the carbon particles in suspension as the size of the carbon particles get smaller. The negative electrical surface charge on filter's granular media also repulses the negatively charged carbon fines resulting in poor filtration efficiency such as the loss of carbon to the effluent. Reducing the electrical charge on carbon particles can be important in improving the handling and application of powdered activated carbon.

In view of the above, and the desire to effect essentially total capture of substantially all carbon, control of the zeta potential of carbon and control of the electrical charge on the filter media is important. Since the electrical charge of these surfaces is generally negative, control of surface charge can be effected by treating with surface active agents. Cationic type organic surfactants and/or polyelectrolytes can be used to adsorb on the surface of the particle and modify the charge. Examples of such well known surface active chemicals are fatty diamines, polyalkylene polyamines, dimethyl dialkyl ammonium chloride polymers (DMDAAC), copolymers of DMDAAC and acrylamide, quaternized fatty amines, polyacrylamides, and the like.

Another method of controlling the electrical surface charge on activated carbon is through the incorporation of certain metals into the carbon. Suitable metals are for example, iron, magnesium, aluminum, tin, zirconium, and thorium. Magnesium is well suited for this purpose because of its effectiveness, low cost and high availability. The amount of metal needed to reduce the zeta potential will depend on the metal and method of incorporation, the type of carbon and method of preparation, and the desired level of reduction in zeta potential.

Common periods for incorporation of metals are during the carbonization or activation steps during the manufacture of activated carbon, or after the activation step such as to the final product. This latter means of metal incorporation can be achieved by simply soaking the activated carbon in a solution of the metal salt. Generally the metal is used in an inexpensive form. When incorporating during carbonization or activation steps, metal oxides, carbonates, inorganic salts, and organometallic salts such as soaps are suitable. When the metal is incorporated by adsorption onto activated carbon, the metal should be applied in a soluble form, then possibly insolubilized by hydrous oxide formation. It is preferred that the powdered activated carbon have a zeta potential more positive than about minus ten millivolts, especially between about $-5$ to about $+5$ millivolts.

One preferred method of removing carbon from water is by means of a cyclone separator. In a cyclone separator, water and solids are separated by centrifugal action. The discrete particles of active carbon are separated from the treated water in a solid-liquid cyclone separator. The flow containing the carbon particles enters the cylindrical inlet chamber of the cyclone near the periphery in a tangential pattern under controlled velocities. The resultant cyclonic flow pattern develops a centrifugal force that retains the carbon particles along the outer wall of the cyclone vessel. The controlled centrifugal flow pattern creates an outer spiraling flow pattern of the carbon particles along and down the outer wall of the cyclone leading to the apex opening where the carbon particles are discharged from the cyclone. As the spiraling flow pattern of the carbon particles is formed along the cyclone wall, an inner spiraling pattern of clarified water is formed. The spiraling clarified water enters into an exit pipe extending down into the vortex region of the cyclone and is thereby discharged from the cyclone.

One especially preferred method of removing carbon from water is wherein the cyclone separator is contained within a reactor vessel which also contains the reaction zone. In this matter, construction costs are minimized. The reactor vessel, which provides for the bulk of carbon contact time and concentration, may enclose the cyclone. This provides for a compact arrangement and simplifies the cyclone construction since it no longer has to withstand the high pressure of the system. Further, multiple inlet parts to the cyclone providing tangential cyclone flow patterns are more easily and economically provided for. The carbon captured by the cyclone may be recycled back to the reactor, externally to an eductor type mixer-contactor, or externally to regeneration or wastage.

An apparatus for the treatment of water can comprise an outer vessel having an inlet so that water and activated carbon or activated sludge can enter; and a cyclone separator disposed within said outer vessel, said cyclone separator having approximately a cylindrical configuration having a top and bottom, the cyclone separator sides slanting inwardly at the bottom forming a conical configuration, said cyclone separator having at least one entry port near the top so that water can enter the separator near the top of the separator and form a spiraling flow pattern within the cyclone, said cyclone having an exit port near the bottom of the cyclone for removing separated activated carbon or sludge, and said cyclone having an exit port extending through the cyclone near the top to a central portion of the separator between the top and bottom so that separated water can be removed from the cyclone separator.

Commonly, an effective amount of polyelectrolyte is added to the clarifier effluent in order to aid the separation of activated carbon from purified water. These polyelectrolytes are well known in the art.

A method of insuring efficient usage of the activated carbon is to regenerate a portion of the separated activated carbon to partially reactivate the carbon. A portion of the reactivated carbon can then be recycled to the clarifier effluent to provide for use of the regenerated carbon. The carbon is at least partially regenerated to partially restore its adsorption properties. Generally adsorbed organics are thermally removed and the carbon surface is reactivated. Depending on economic factors, it is desirable to reactivate the carbon to different levels. While it is generally preferred to regenerate the carbon to at least about 70 percent of its original BET surface activity, it may be sometimes desirable to regenerate to somewhat lower levels.

The activated carbon can be reactivated or regenerated by any number of methods. For example, the carbon can be incinerated in order to oxidize organic materials off the carbon. Oxidation gas conditions must be carefully controlled so that the carbon is not burnt up. One common method of incineration is a fluid bed process which circulates a hot heat conducting material such as sand, to which the sludge/carbon mixture is injected. Fluid bed incinerators commonly operate in the range of from about 1200° F. to about 1500° F. Another common method of incineration is a multiple hearth carbon regeneration process. This process passes the carbon/sludge mixture to a furnace having a carefully controlled atmosphere. Different zones of the furnace have different temperatures for drying, oxidation of organics, and regeneration of the carbon. The operating temperatures range from about 1200° F. to about 1900° F.

One preferred method of carbon regeneration is the wet air oxidation process. In this process, the carbon to be regenerated is thickened and passed as a slurry to a zone where it is contacted with air under very high pressure at elevated temperatures. Commonly the regeneration takes place at about 390° F. to about 470° F. where at regeneration and selective oxidation takes place. The regeneration is conducted without dewatering the carbon slurry. The regenerated carbon slurry and regenerator gases are cooled and returned to the waste water process.

While the previously described process can be used to purify surface and subterranean waters, it can also be used to purify waste water which has already been partially purified, thereby producing an extremely clean effluent. Generally, pretreatment is required to reduce TOC to less than about 25 mg/l, prior to use of the previously described process. It is peferred to reduce TOC less than about 10 mg/l prior to the use of the described process. Effective means of pretreatment to reduce TOC to suitable levels often comprise activated sludge processes.

THE DRAWINGS

Figure 1:
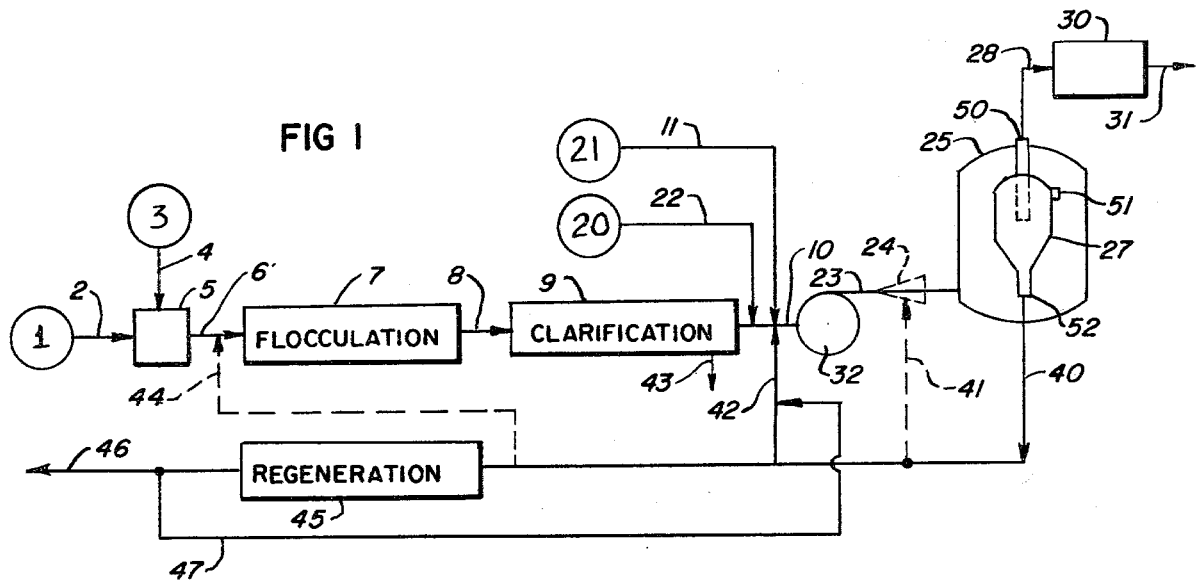
FIG. 1 is a schematic drawing of a waste water treating process for making potable water or for making extremely pure water.

Referring to FIG. 1, water to be treated 1 is passed through line 2 to a zone 5 where chemicals 3 are injected through line 4. Water 1 is commonly lake water or surface water which will be purified for use as potable water. Mixing zone 5 can be a container or reactor or it can be merely a pipe where chemicals are injected in-line. Water from mixing zone 5 passes through line 6 to flocculation area 7. In this zone, the water is mixed gently, generally at ambient temperature, so as to promote flocculation and to prevent solids from becoming unnecessarily suspended. In the flocculation zone 7, air or oxygen may be injected. Water from flocculation zone 7 containing flocculated solids passes thrugh line 8 to the clarification zone 9. In this clarification zone suspended solids are commonly removed. Generally this is affected by gravity sedimentation but in some cases it can be effected by filtration. Separated solids from clarification zone 9 are removed through line 43. Partially purified water from clarification zone 9 passes through line 10. Powdered activated carbon and chemicals such as polyelectrolytes 21 are added through line 11. The water is then passed through pump 22 to line 23 and then on to reactor 25. In reactor 25 the water contacts the powdered activated carbon for time sufficient to remove substantial amounts of impurities. In the case where this process is being used as a final clean up after a waste water treating process, the flocculation and clarification steps are commonly omitted. In this case, water 20 containing less than about 25 mg/l of TOC is passed through line 22 to line 10 for processing. This water 20 to be treated has commonly been purified partially in an activated sludge process. A water and carbon mixture from reactor 25 passes through inlet 51 to cyclone separator 27. In this cyclone separator 27, water is separated from the carbon and passed out through line 28. Preferably, cyclone separator 27 is within reactor 25. Effluent from separator 27 can optionally receive filtration at filter 30 and be passed out via line 31. Separated carbon from the cyclone reactor 27 is passed down through line 40 for either recycle or regeneration. When the separated powdered activated carbon is to be recycled, it can be passed through line 42 to line 10 where it is combined with water to be treated. An alternate method of recycle is to pass powdered activated carbon from line 40 through line 41 to eductor 24 into line 23. In this manner, equipment costs for pumping to reactor 25 can be reduced. A portion of the carbon from the cyclone separator 27 can also be passed through line 40 to line 44 for injection into line 6 prior to flocculation into line 7. This can reduce the amount of chemicals 3 needed. Where the carbon is to be regenerated, powdered activated carbon is passed through line 40 to regenerator 45. Regenerator 45 can be a fluidized bed incinerator, a multiple hearth carbon regeneration process, or preferably a wet air oxidation process. In the regeneration area, the carbon is at least partially reactivated or regenerated. Organic materials are removed from the surface of the carbon. Regenerated powdered activated carbon is then passed through line 46, possibly for use in an upstream activated sludge process, or passed through line 47 for injection into line 42 for reuse in the powdered activated carbon reaction system.

Figure 2:
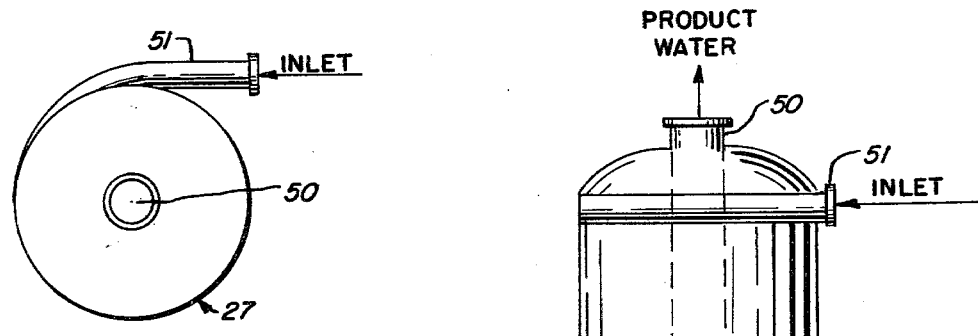
FIG. 2 is a top view of a separator for the separation of powdered activated carbon from water.

The activated carbon reactor does not necessarily contain the cyclone separation zone. FIG. 2 is a top view of a cyclone separator. The mixture to be separated enters inlet 51 which is approximately tangential to the approximately circular top view of separator 27. Outlet 50 is generally a pipe or passageway providing a path of escape for purified water. Outlet 50 is commonly a pipe extending about ⅓ to about ½ of the longitudinal distance of the cyclone.

Figure 3:
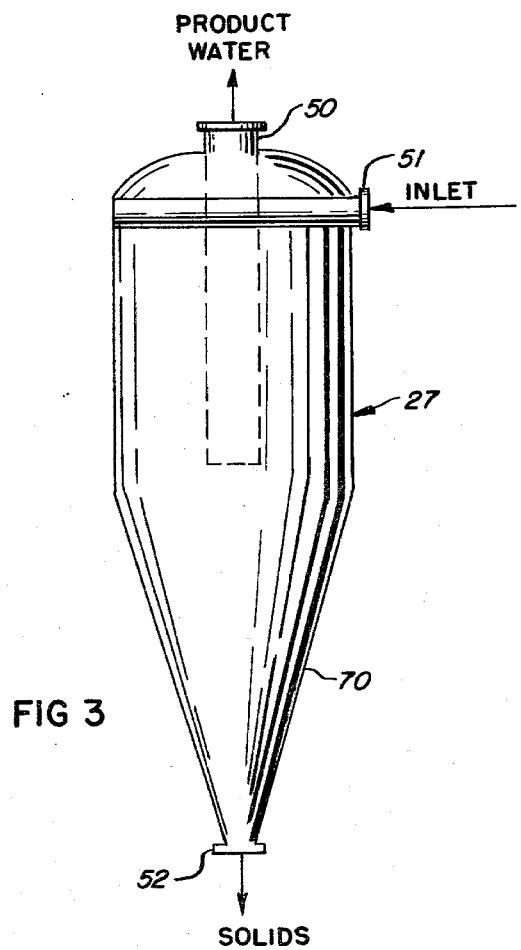
FIG. 3 is a side view of a separator for separating powdered activated carbon from water.

FIG. 3 is a side view of a cyclone separator 27. Inlet 51 and outlet 50 can be seen as above. Because of the tapered or slanting side 70 of separator 27 solids accumulate at the bottom of the separator and are removed at outlet 52.

Figure 4:
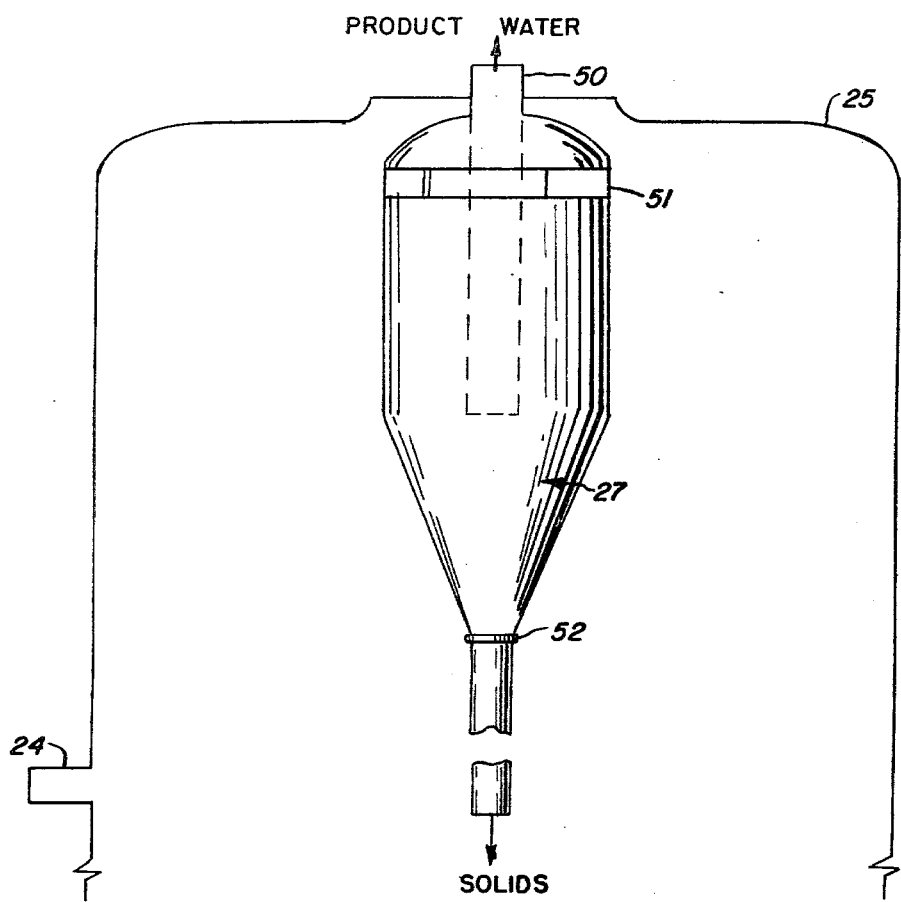
FIG. 4 is a powdered activated carbon reactor which contains a cyclone separator for the separation of powdered activated carbon from water.

FIG. 4 is a preferred case wherein separator 27 is contained within reactor 25. In this configuration, there is little pressure differential across the walls of cyclone separator 27. The water carbon mixture enters reactor 25 through inlet 24 wherein sufficient contact time between the carbon and the water and impurities is achieved. Cyclone separator 27 is contained within reactor 25. The water/carbon mixture enters the separator through one, or preferably a multiplicity, of entry ports 51. The carbon is separated and removed from cyclone separator 27 through line 52. Purified water is passed out of separator 27 through line 50.

We claim:

1. A process of water treatment to produce potable water comprising:
    adding an effective amount of chemical flocculant to the feed water and subjecting said water to flocculation;
    passing the flocculated water to a clarifier or filter where suspended solids are separated from the partially purified water;
    adding about 1 to about 100 parts powdered activated carbon per million parts of water from the clarifier or filter;
    contacting the water with said carbon in a reaction zone so as to achieve substantial reduction of contaminants in the water;
    separating the activated carbon from the purified water; and
    recycling a portion of the separated activated carbon to the clarifier or filter effluent.

2. The process of claim 1 wherein the concentration of activated carbon in the reaction zone is greater than about 25 ppm.

3. The process of claim 2 wherein the concentration of activated carbon in the reaction zone is greater than about 50 ppm.

4. The process of claim 1 wherein the powdered activated carbon has a surface area greater than about 1500 square meters per gram.

5. The process of claim 4 wherein powdered activated carbon has a surface area greater than about 2500 square meters per gram.

6. The process of claim 1 wherein a portion of the separated activated carbon is recycled to the water feed to flocculation.

7. The process of claim 1 wherein an effective amount of polyelectrolyte is added to the clarifier or filter effluent in order to aid the separation of activated carbon from purified water.

8. The process of claim 1 wherein the carbon is separated from the purified water by means of a cyclone separator.

9. The process of claim 8 wherein the cyclone separation is contained within a reactor vessel which also contains the reaction zone.

10. The process of claim 1 wherein a portion of the separated activated carbon is regenerated to partially reactivate the carbon.

11. The process of claim 10 wherein a portion of the reactivated carbon is recycled to the clarifier effluent.

12. The process of claim 1 wherein powdered activated carbon has a zeta potential in the range of about −5 to +5 millivolts.

13. A process of water treatment to produce water of very high purity comprising:
    adding an effective amount of chemical flocculant to feed water having a TOC of less than about 25 mg/l and subjecting said water to flocculation;
    passing the flocculated water to a clarifier or filter where suspended solids are separated from the partially purified water;

adding about 1 to about 100 parts powdered activated carbon per million parts of water from the clarifier or filter;

contacting the water with said carbon in a reaction zone so as to achieve substantial reduction of contaminants in the water;

separating the activated carbon from the purified water; and recycling a portion of the separated activated carbon to the clarifier or filter effluent.

14. The process of claim 13 wherein the concentration of activated carbon in the reaction zone is greater than about 25 ppm.

15. The process of claim 14 wherein the concentration of activated carbon in the reaction zone is greater than about 50 ppm.

16. The process of claim 13 wherein the powdered activated carbon has a surface area greater that about 1500 square meters per gram.

17. The process of claim 16 wherein powdered activated carbon has a surface area greater than about 2500 square meters per gram.

18. The process of claim 13 wherein a portion of the separated activated carbon is recycled to the water feed to flocculation.

19. The process of claim 13 wherein an effective amount of polyelectrolyte is added to the clarifier effluent in order to aid the separation of activated carbon from purified water.

20. The process of claim 13 wherein the powdered activated carbon has a zeta potential preferably in the range of about $-5$ to $+5$ millivolts.

21. The process of claim 13 wherein the carbon is separated from the purified water by means of a cyclone separator.

22. The process of claim 21 wherein the cyclone separation is contained within a reactor vessel which also contains the reaction zone.

23. The process of claim 13 wherein a portion of the separated activated carbon is regenerated to partially reactivate the carbon.

24. The process of claim 23 wherein a portion of the reactivated carbon is recycled to the clarifier effluent.

25. A process for the purification of water comprising contacting said water with powdered activated carbon in a reactor vessel, said reactor vessel containing a cyclone separator within said reactor vessel, and separating the powdered activated carbon from purified water by means of said cyclone separator.

26. An apparatus for the treatment of water comprising:

an outer vessel having an inlet so that water and activated carbon or activated sludge can enter; and a cyclone separator disposed within said outer vessel, said cyclone separator having approximately a cylindrical configuration having a top and bottom, the cyclone separator sides slanting inwardly at the bottom forming a conical configuration, said cyclone separator having at least one entry port near the top so that water can enter the separator near the top of the separator and form a spiraling flow pattern within the cyclone, said cyclone having an exit port near the bottom of the cyclone for removing separated activated carbon or sludge, and said cyclone having an exit port extending through the cyclone near the top to a central portion of the separator between the top and bottom so that separated water can be removed from the cyclone separator.

* * * * *